(12) United States Patent
Pettitt et al.

(10) Patent No.: US 12,160,507 B2
(45) Date of Patent: Dec. 3, 2024

(54) CONTENT ENCRYPTION

(71) Applicant: Google LLC, Mountain View, CA (US)

(72) Inventors: John Philip Pettitt, San Francisco, CA (US); Malte Ubl, Alameda, CA (US); Dmytro Voytenko, San Francisco, CA (US)

(73) Assignee: Google LLC, Mountain View, CA (US)

( * ) Notice: Subject to any disclaimer, the term of this patent is extended or adjusted under 35 U.S.C. 154(b) by 312 days.

(21) Appl. No.: 17/432,790

(22) PCT Filed: Mar. 21, 2019

(86) PCT No.: PCT/UA2019/000038
§ 371 (c)(1),
(2) Date: Aug. 20, 2021

(87) PCT Pub. No.: WO2020/190246
PCT Pub. Date: Sep. 24, 2020

(65) Prior Publication Data
US 2022/0004599 A1 Jan. 6, 2022

(51) Int. Cl.
*H04L 9/08* (2006.01)
*H04L 9/14* (2006.01)
(Continued)

(52) U.S. Cl.
CPC .............. *H04L 9/0869* (2013.01); *H04L 9/14* (2013.01); *H04L 9/30* (2013.01); *H04L 63/045* (2013.01); *G06F 21/1062* (2023.08)

(58) Field of Classification Search
CPC ......... H04L 9/14; H04L 9/30; H04L 2209/16; H04L 2209/60; H04L 2209/603;
(Continued)

(56) References Cited

U.S. PATENT DOCUMENTS

| 7,921,450 B1 | 4/2011 | Vainstein et al. |
| 10,410,000 B1 * | 9/2019 | Ghafourifar .......... G06F 21/602 |

(Continued)

FOREIGN PATENT DOCUMENTS

| CN | 101014922 A | 8/2007 |
| CN | 101821747 A | 9/2010 |
| CN | 104205123 A | 12/2014 |

OTHER PUBLICATIONS

PCT International Search Report and Written Opinion in International Application No. PCT/UA2019/000038, dated Nov. 26, 2019, 9 pages.

(Continued)

*Primary Examiner* — Eric W Shepperd
(74) *Attorney, Agent, or Firm* — Brake Hughes Bellermann LLP (57) ABSTRACT

Methods, systems, and apparatus, including computer programs encoded on a computer storage medium, for securely publishing and accessing a media's premium content. Methods include a media that comprises premium content encrypted with a first cryptographic key. The media also comprises data structures that include this key and the access entitlements. These data structures are encrypted using the key for each entity that can authorize user access to the media. Methods further include verifying user access to the media and then providing the decrypted premium content. Methods include decrypting the data structure using the authorizing entity's key and providing the first cryptographic key in the decrypted data structure to the client device, after verifying that the user has the appropriate access entitlements for the media. Methods include decrypting the premium content using the first cryptographic key and then displaying the media, including the decrypted premium content, on the client device.

20 Claims, 5 Drawing Sheets

(51) Int. Cl.
*H04L 9/30* (2006.01)
*H04L 9/40* (2022.01)
*G06F 21/10* (2013.01)

(58) Field of Classification Search
CPC .............. H04L 63/0442; H04L 63/045; H04L 63/0478; H04L 2463/101
See application file for complete search history.

(56) References Cited

U.S. PATENT DOCUMENTS

| | | | |
|---|---|---|---|
| 10,621,518 B2* | 4/2020 | Robert | H04L 9/083 |
| 2002/0065781 A1* | 5/2002 | Hillegass | H01R 13/22 |
| | | | 705/59 |
| 2003/0152222 A1* | 8/2003 | Nakano | G11B 20/00855 |
| | | | 380/201 |
| 2005/0144478 A1* | 6/2005 | Yamanaka | H04N 7/1675 |
| | | | 726/4 |
| 2005/0289139 A1* | 12/2005 | Takashima | G11B 20/00086 |
| | | | 707/999.005 |
| 2007/0044010 A1* | 2/2007 | Sull | G06F 16/71 |
| | | | 709/201 |
| 2007/0083473 A1* | 4/2007 | Farrugia | H04N 21/00 |
| | | | 705/57 |
| 2007/0288386 A1* | 12/2007 | Adachi | H04L 9/0825 |
| | | | 705/58 |
| 2008/0255994 A1* | 10/2008 | Schnell | G06Q 30/02 |
| | | | 705/52 |
| 2008/0274687 A1* | 11/2008 | Roberts | H04N 21/47202 |
| | | | 455/3.06 |
| 2009/0097660 A1 | 4/2009 | Malaviarachchi et al. | |
| 2011/0164753 A1* | 7/2011 | Dubhashi | H04N 21/4627 |
| | | | 380/282 |
| 2012/0017282 A1* | 1/2012 | Kang | H04N 21/8453 |
| | | | 726/26 |
| 2014/0245400 A1* | 8/2014 | Chen | H04N 21/44055 |
| | | | 726/4 |
| 2015/0033008 A1* | 1/2015 | Einarsson | H04L 9/065 |
| | | | 713/150 |
| 2016/0134638 A1 | 5/2016 | Tulshibagwale | |
| 2016/0239646 A1* | 8/2016 | Lester | G06F 21/6209 |
| 2018/0018677 A1 | 1/2018 | Schnell et al. | |

OTHER PUBLICATIONS

First Office Action with English translation for Chinese Application No. 201980093750.9, mailed Nov. 14, 2023, 31 pages.

* cited by examiner

CONTENT ENCRYPTION

CROSS-REFERENCE TO RELATED APPLICATION

This application is a National Stage Application under 35 U.S.C. § 371 and claims the benefit of International Application No. PCT/UA2019/000038, filed Mar. 21, 2019. The disclosure of the foregoing application is hereby incorporated by reference in its entirety.

BACKGROUND

This specification relates to the distribution and access to premium media content. The Internet facilitates the exchange of information and transactions between users across the globe. This exchange of information enables distribution of media content to a variety of users. In some situations, publishers of the media may want to restrict access to all or portions of the media to certain users. For example, in the case of a news article, a publisher may make the first paragraph of the article freely available to the public, while restricting access to the remainder of the article (i.e., premium content) to paid subscribers.

Conventionally, restricting access to premium content has been accomplished in two ways. One way, generally known as the client side method, delivers the entire content to the requesting user, but only displays the restricted or premium content upon determining whether the user is authorized to view this content. In this approach, the premium content may nevertheless be available, for example, in the plain text of the document. Another approach, generally referred to as the server side method, delivers the premium content to the user only after determining that the user is authorized to view the content.

SUMMARY

In general, one innovative aspect of the subject matter described in this specification can be embodied in methods including the operations of generating, for a media having a first content and a second content, a first cryptographic key; encrypting, by the first cryptographic key, the second content to generate a partially encrypted media that includes the first content and an encrypted second content; generating a data structure comprising the first cryptographic key and an access data specifying access entitlements for the second content; encrypting, by a second cryptographic key, the data structure to generate a first encrypted data structure; and including, with the partially encrypted media, the first encrypted data structure. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can further include that one or more authorizers different from a first entity that publishes the media; for each authorizer of the one or more authorizers, encrypting, by a cryptographic key for the authorizer, the data structure to generate a respective authorizer specific encrypted data structure; including, with the encrypted media, each authorizer specific encrypted data structure.

Methods can further include that the second cryptographic key and the cryptographic key for each authorizer are public keys.

Methods can further include that each authorizer of the one or more authorizers comprises a search indexer, a cache service, a content delivery network (CDN), or a paywall service.

Methods can further include the action of transmitting the partially encrypted media to a host server.

Methods can further include that the access data specifying access entitlements for the media does not comprise any user identifying data.

Methods can further include that the first cryptographic key is a randomly generated key that is unique to the media.

Methods can further include that the first encrypted data structure includes a key identifier for the second cryptographic key; and each authorizer specific encrypted data structure includes a key identifier corresponding to the respective cryptographic key for the authorizer.

Methods can further include that the media comprises a document written in a markup language; and including the first encrypted data structure and each authorizer specific encrypted data structure in the header of the document.

In general, another innovative aspect of the subject matter described in this specification can be embodied in methods including the operations of receiving, from a first entity, an encrypted data structure included with a media, wherein: the encrypted data structure being encrypted with a first cryptographic key; the encrypted data structure storing a second cryptographic key and access data specifying access entitlements for the media; and the media comprising a first portion being encrypted with the second cryptographic key and a second portion; decrypting, using a third cryptographic key, the encrypted data structure to generate a decrypted data structure; determining whether the first entity can access the media by comparing an access entitlement for the first entity with the access data in the decrypted data structure; transmitting, to the first entity, the second cryptographic key, upon determining that the first entity can access the media. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Methods can further include that the first cryptographic key and third cryptographic key belong to a second entity.

Methods can further include that the second entity publishes the media.

Methods can further include that the second entity is different from an entity that publishes the media and may comprise a search indexer, a cache service, a CDN, or a paywall service.

Methods can further include that the first cryptographic key is a public cryptographic key and the third cryptographic key is a private cryptographic key corresponding to the public cryptographic key.

Methods can further include that the second cryptographic key is a randomly generated number that is unique to the media.

Methods can further include that the access entitlement for the first entity and the access data do not include any user identifying data.

Methods can further include that the encrypted data structure further comprises a key identifier for the first cryptographic key; and the second cryptographic key includes the key identifier.

Methods can further include that the media comprises a document written in a markup language; and the encrypted data structure is included in the header of the document.

Particular embodiments of the subject matter described in this specification can be implemented to realize one or more of the following advantages. The innovations described in this specification allow secure distribution of a publisher's entire media to users. A publisher can make the entire media accessible while restricting access to the media's premium content by encrypting this content. Thus, unlike the conventional client side method, a user or crawler obtaining the media cannot view the premium content, in plain text or otherwise, without having the appropriate key to decrypt the premium content.

The innovations described in this specification can maintain user privacy by not disclosing any user identifying data in distributing or accessing the media.

The innovations described in this specification also allow for delegation of access authorization to premium content while maintaining user privacy. For example, by using symmetric encryption techniques, e.g., encrypting a media using the same document-specific cryptographic key that will be used to decrypt the media, enables multiple authorizers to access and decrypt the media without needing to access any user data.

The innovations described in this specification also allow for reduced bandwidth usage and reduced battery demands on the client device. For example, when a user decides to view premium content in a media, the user does not need to issue a second communication to either retrieve the entire content (with her credential) or execute log-in communications with a restricted site and then take further steps when logged in to view and/or retrieve that content.

The innovations described in this specification improve system performance by reducing the storage and processing needs at the client side and the server side. For example, once the client receives the media, which already includes the premium content, no further document fetches or redirects are necessary.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure relates to computer implemented methods and systems that facilitate the distribution of and access to premium (e.g., paid or restricted) media to authorized users using encryption techniques.

A publisher publishes media and may want all or portions of the media to be accessible by certain authorized users (e.g., users who may have paid to access this specific media or to the premium or paid media generate or published by the publisher). The publisher may accomplish this using a two-step encryption process.

First, the publisher uses a symmetric encryption algorithm to encrypt the entire media content or certain portions of the media using a first cryptographic key. For example, a publisher may want to restrict access to the entire media content, or the publisher may want to provide a portion of the media content free to any user, while restricting access to the remaining portions of the media for authorized users. The first cryptographic key is unique to the media and is randomly generated.

Second, the publisher generate a data structure comprising the first cryptographic key and the access data specifying required access entitlements for the media. The access data specifying required access entitlements may or may not include user information. The publisher may encrypt this data structure using a cryptographic key (e.g., an internal or public key) for each entity that will determine whether a user can access the media. For example, while a publisher may want to authorize whether a user can be granted access to the premium media content, it may also delegate such authorization duties to other entities such as search indexers, cache services, CDNs, or paywall services. Accordingly, for each entity that will authorize (i.e., an authorizer) whether a user is entitled to access the media, the publisher generates a separate authorizer specific encrypted data structure for each authorizer. More specifically, the publisher uses the data structure comprising the first cryptographic key and the access data specifying required access entitlements for the media and then encrypts this data structure using the internal or public cryptographic key of an authorizer. The publisher repeats this for each additional authorizer and as a result, the publisher generates a separate authorizer specific encrypted structure for each authorizer. A key identifier, which identifies the key used to encrypt the data structure, may also be included along with the encrypted data structure.

All the encrypted data structures are included in the media. For example, in the case of a document written in a markup language, such as HyperText Markup Language (HTML), the encrypted data structures may be included in the document's header. The encrypted media thus includes the encrypted portion of the media, the unencrypted portion of the media (where applicable), and the encrypted data structures.

When a user requests access to the media through a user device, the encrypted media is transmitted to the user device. The user through the user device can request authorization and decrypt the media by requesting authorization from an authorizer, decrypting the encrypted portions of the media, and then accessing the entire media content.

The user device requests access to the encrypted media content by sending authorization requests to the publisher and/or one or more authorizers. Each authorization request includes an encrypted data structure that is included with the encrypted media and that is encrypted with the authorizer's or the publisher's internal or public key.

The publisher and/or the authorizers then determine whether to grant access to the user. The publisher or authorizer, upon receiving the encrypted data structure, decrypts this data structure with its internal or private key. The publisher or authorizer determines whether the user is entitled to access the media by comparing the user's access entitlements with the access entitlements included in the decrypted data structure. If the publisher or authorizer determines that the user has the appropriate access entitlement to the media, it provides the first cryptographic key to the user device.

The user device uses this first cryptographic key to decrypt the encrypted portions of the media and where applicable, merge the encrypted portions of the media with the unencrypted portions. Subsequently, the user device presents the entire unencrypted media content to the user.

These features and additional features are described in more detail below.

Figure 1:
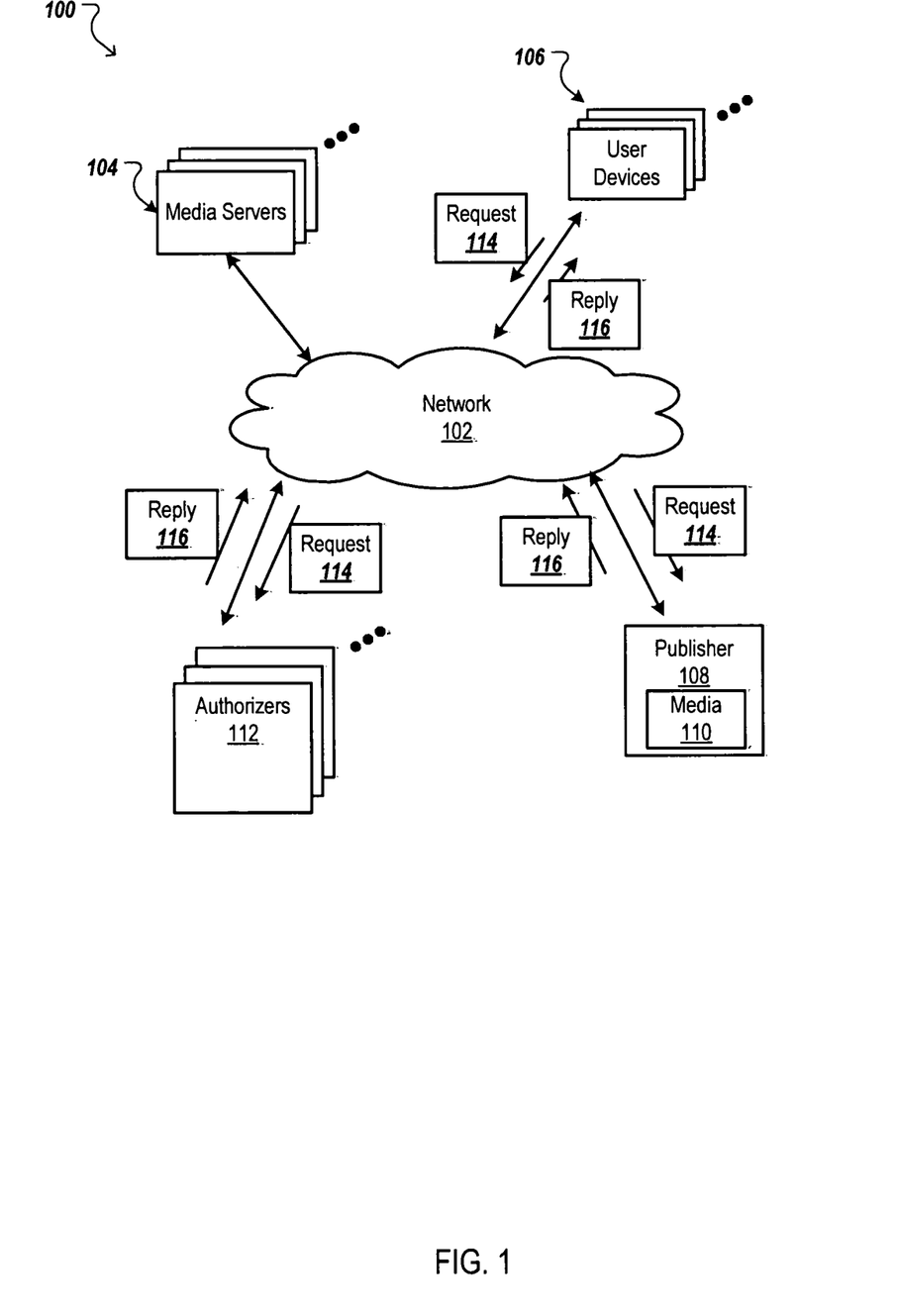
FIG. 1 is a block diagram of an example environment in which media is distributed and accessed.

FIG. 1 is a block diagram of an example environment 100 in which media is distributed and accessed. The example environment 100 includes a network 102, such as a local area network (LAN), a wide area network (WAN), the Internet, or a combination thereof. The network 102 connects media servers 104, user devices 106, publishers 108, and authorizers 112. The example environment 100 may include many different media servers 104, user devices 106, publishers 108, and authorizers 112.

A user device 106 is an electronic device that is capable of requesting and receiving resources over the network 102. Example user devices 106 include personal computers, mobile communication devices, digital assistant devices, and other devices that can send and receive data over the network 102. A user device 106 typically includes a user application, such as a web browser, to facilitate the sending and receiving of data over the network 102, but native applications executed by the user device 106 can also facilitate the sending and receiving of data over the network 102.

Publisher 108 and authorizers 112 are realized by computer systems, as described with reference to FIG. 5 below.

Media 110 is data that a user device 106 processes to present a set of content at the user device 106. Examples of media include webpages written in markup languages such as HTML, word processing documents, portable document format (PDF) documents, images, videos, search results pages, and feed sources.

Media can be provided to user devices 106 by media servers 104. For example, the media servers 104 can include servers that host publisher's media 110. In this example, the user device 106 can initiate a request for a web page including the publisher's media 110, and the media server 104 that hosts that webpage can respond to the request by sending machine executable instructions that initiate presentation of the given webpage at the user device 106.

In another example, the media servers 104 can include app servers from which user devices 106 can download apps. In this example, the user device 106 can download files required to install an app on the user device 106, and then execute the downloaded app locally. The apps may then be used to access and present media. For example, a news reader app may be used by the user device 106 to request news content from a publisher 108.

In some situations, the media 110 can include a script, which is executed by the user device 106 when the media 110 is processed by the user device 106. Execution of the script can configure the user device 106 to generate a request 114 and send this request 114 over network 102 to certain entities, such as publishers 108 or authorizers 112, which may include caches, paywall services, CDNs, and search indexers.

For example, the script may generate a request to the publisher 108 to authorize the user's access to the media 110. The script may also generate similar access requests to authorizers 112 who may be capable of granting access to the media 110.

In response to the request 114, the publisher 108 and/or the authorizers 112 generate reply data 116 that is transmitted over network 102 to the user device 106. The reply data 116 may, in some implementations, include instructions, and the user device 106 executes the instructions included in the reply data 116. For example, the reply data 116 may include data enabling access to the media 110, as described in more detail below with reference to FIGS. 2 and 4 below. The reply data 116 issued by the publisher 108 includes a cryptographic key necessary to decrypt encrypted portions of the media 110 already downloaded from the media server 104 onto the user device 106.

Figure 2:
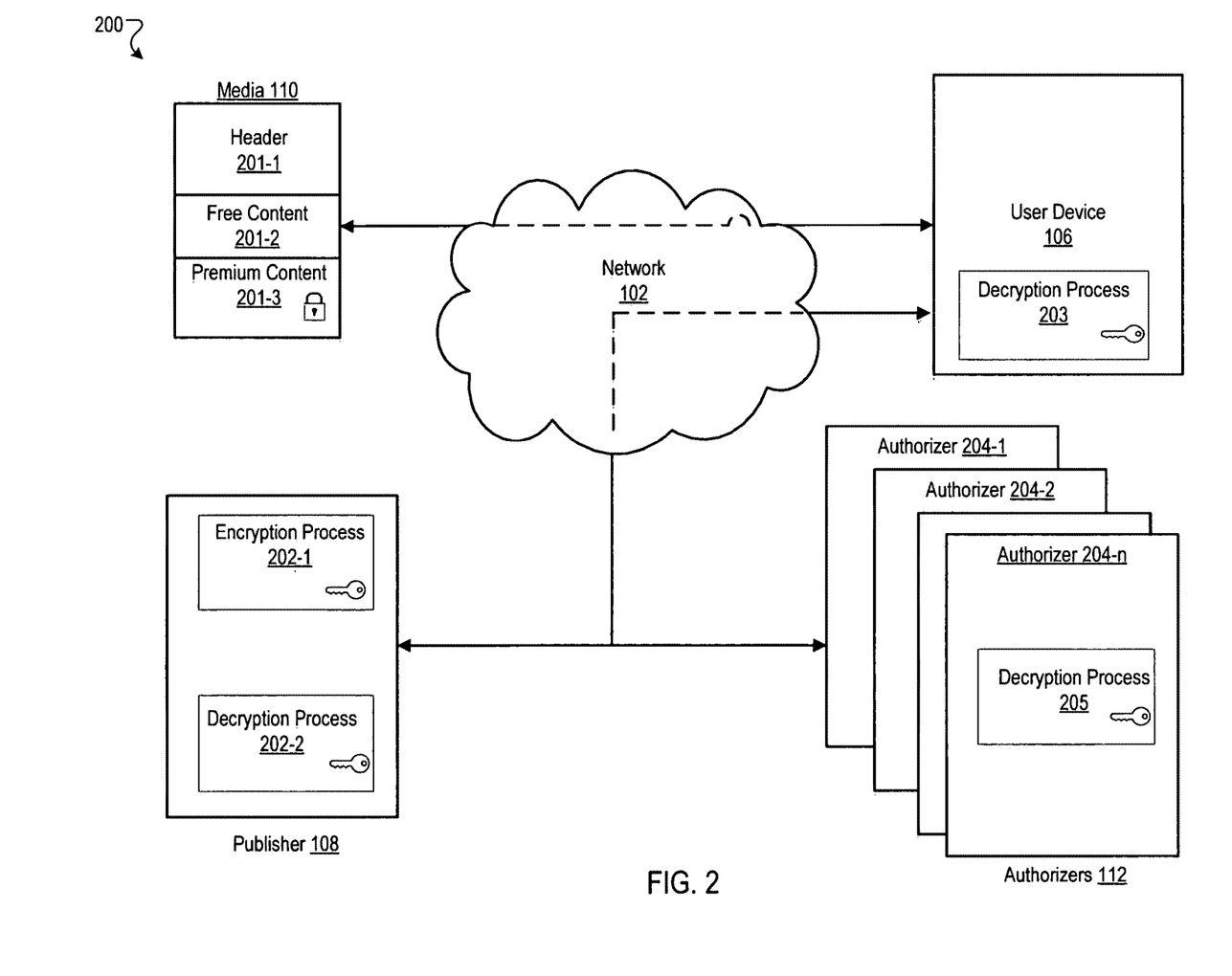
FIG. 2 is a block diagram of another example environment in which premium media content is distributed and accessed.

FIG. 2 is a block diagram of another example environment 200 in which premium media content is distributed and accessed. The environment 200 is one example environment that can be utilized in the environment 100 of FIG. 1.

In the embodiment of FIG. 2, media 110 is a document written in a markup language such as HTML. The media 110 includes a header 201-1, free content 201-2, and premium content 201-3.

Using an encryption process 202-1 (as described with reference to FIG. 3 below), the publisher 108 encrypts the premium content 201-3.

The user device 106 may request access to media 110 over the network 102 from a media server 104 hosting a web page including the media 110. In response, the media 110 is transmitted to the user device 106.

Once the user device 106 receives the media 110, the user device 106 presents the media 110 to the user. While the user of the user device 106 will be able to view the free content 201-2, the user will not able to view the encrypted premium content 201-3 in media 110. As an illustrative example, a user, via its browser, may visit a news website and access a news article containing premium content. When the news article is retrieved and presented on the user's browser, only the first paragraph of the article may be displayed to the user. The remainder of the article remains obscured until the user requests access to the premium content and receives permission to view the premium content.

The user through the user device 106 may request access to the encrypted premium content 201-3. As a result, the user device 106 transmits an access request to publisher 108. In some scenarios, the publisher 108 may allow one or more authorizers 112 (which may include authorizers 204-1 to 204-n) to grant access to the media 110. Authorizers 204-1 to 204-n may include paywall services, caches, CDNs, or search indexers. In the scenario where publishers allow authorizers to grant access to the media, the user device 106 may also transmit one or more access requests to authorizer 204-1 to 204-n. The details of the process by which the user device 106 requests access from the publisher 108 and/or authorizers 112 is described with reference to FIG. 4 below.

Upon receiving the access request from the user device 106, the publisher 108 and authorizers 204-1 to 204-n may utilize a decryption process 202-2 or 205, respectively, to determine whether the user has the appropriate entitlements to access the media. An example decryption process is described below with reference to FIG. 4. If the user has the appropriate access entitlements, the publisher 108 and/or the authorizers 204-1 to 204-n grant the user access to the premium content 201-3. On the other hand, if the user does not have the appropriate access entitlements, the publisher 108 and/or the authorizers 204-1 to 204-n deny the user's request to access the premium content 201-3. The details of the process by which the publisher 108 and/or the authorizers 204-1 to 204-*n* determine whether to grant or deny a user's access request is described with reference to FIG. 4 below.

In the above example, when the user is granted access to the media, the publisher 108 and/or the authorizers 204-1 to 204-*n* transmit information, such as a cryptographic key that is be used to decrypt the premium content 201-3, to the user device 106. The user device 106 then uses a decryption process 203 (as described with reference to FIG. 4 below) to decrypt the encrypted premium content 201-3 using the cryptographic key received from the publisher 108 and/or authorizers 204-1 to 204-*n*. The user device 106 then merges the decrypted premium content 201-3 with the free content 201-2.

The user device 106 then displays the entire unencrypted media content to the user. The details of the process by which the publisher 108 and/or the authorizers 204-*n* to 204-*n* determine whether to grant or deny a user's access request is described with reference to FIG. 4 below.

In the above example, media 110 included two types of content: free content 201-2 and premium content 201-3. The free content 201-2 is provided in unencrypted form, while the premium content 201-3 is provided in encrypted form. However, there may be scenarios where the content of media 110 may include only premium content. In other words, there may be scenarios where the publisher 108 may restrict access to the entire content of media 110 to only authorized users. Nevertheless, the implementation of FIG. 2 (as well as the associated processes described with reference to FIGS. 3 and 4) may be utilized for media where the entire content is premium.

Figure 3:
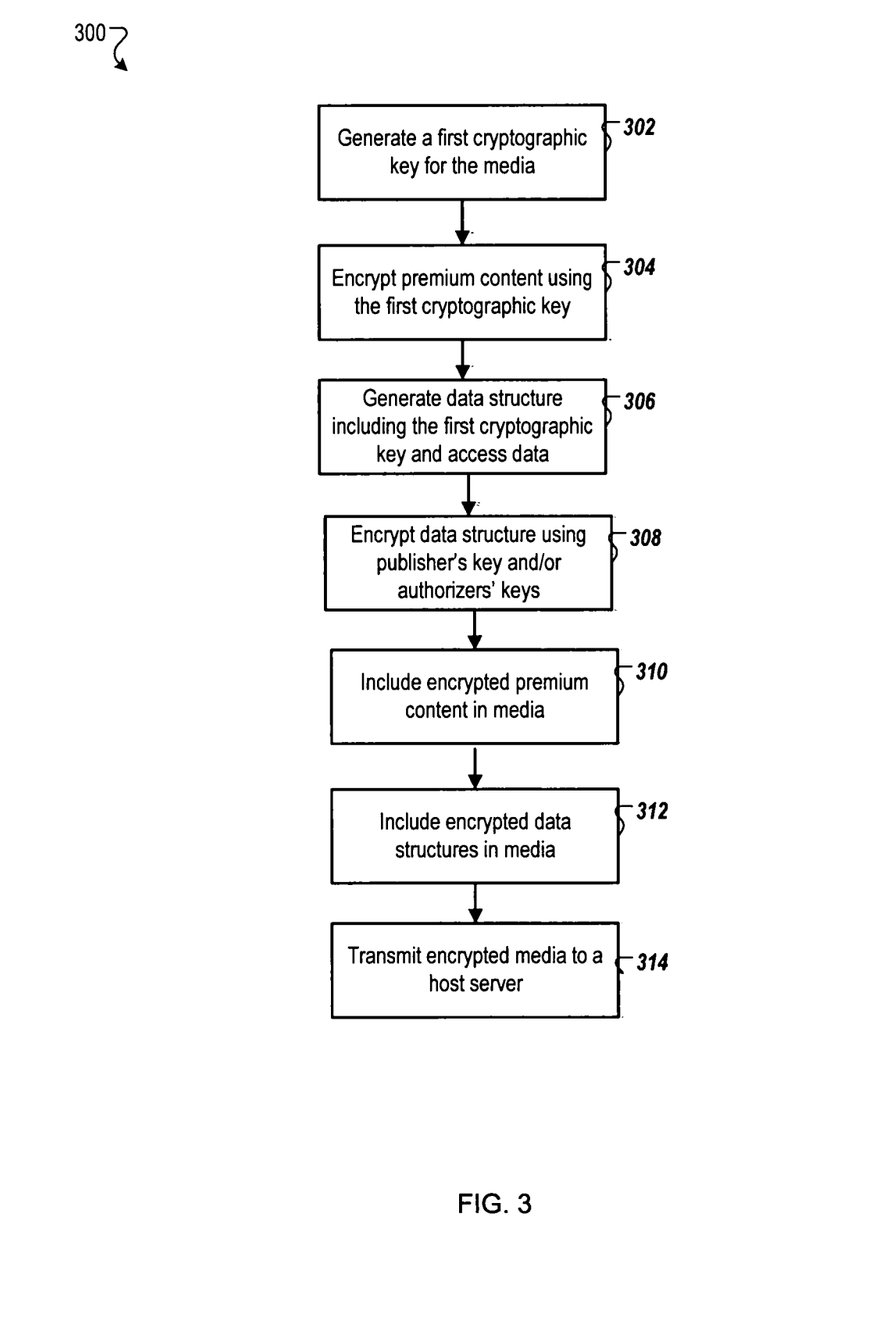
FIG. 3 is a flow diagram of an example process to encrypt the premium content in media 110.

FIG. 3 is a flow diagram of an example process 300 to encrypt the premium content in media 110. The process 300 may be implemented in a data processing apparatus as described with reference to FIG. 5, or any other appropriate processing system.

At step 302, the publisher 108 generates a first cryptographic key (e.g., using a random number generator) for the media. The media may include only premium content or both free content and premium content. The first cryptographic key is unique to the media. In other words, the publisher 108 creates a separate cryptographic key for each media that it generates and/or distributes.

At step 304, the publisher 108 encrypts the premium content in the media using the first cryptographic key. The encryption may be performed using encryption algorithms such as Advanced Encryption Standard-Counter-256 (AES-CTR-256), or any other appropriate symmetric encryption algorithm.

At step 306, the publisher 108 generates a data structure including the first cryptographic key and access data for the media. The access data specifies required access entitlements for the media's premium content. In some implementations, access data may include user identifying information. For example, the access data may specify data that can be used to identify or verify each particular user that has access to the premium content. Alternatively, the access may not include any user identifying information by, for example, only specifying the required subscription for the media. For example, premium articles on an exemplary news website may be viewed only by users who have a monthly subscription, an annual subscription, or a trial membership. The access data may specify these entitlements.

At step 308, the publisher 108 encrypts the data structure in step 306 using a cryptographic key (e.g., an internal key or, alternatively, public key) for each entity that will determine whether a user can access the media. For example, while a publisher 108 may want to authorize whether a user can be granted access to the premium media content, it may also share such authorization duties with authorizers 204-1 to 204-*n* (as explained above with reference to FIG. 2). In this example, the publisher 108 encrypts the data structure using its own cryptographic key to generate one encrypted data structure. The publisher also encrypts the data structure using the cryptographic key for an authorizer to generate an authorizer specific encrypted data structure. The publisher repeats this for each authorizer. As a result, the publisher generates an encrypted data structure for the publisher as well as separate authorizer specific encrypted data structures for each authorizer.

The publisher may associate a separate identifier with each encrypted data structure. Each such identifier corresponds to the entity whose cryptographic key was used to encrypt the data structure.

The publisher 108 and/or authorizers 204-1 to 204-*n* may choose to use symmetric or asymmetric encryption. If using symmetric encryption, the publisher 108 encrypts the data structure using the same cryptographic key used to decrypt the data structure. If using asymmetric encryption, the publisher 108 encrypts the data structure using the entity's (authorizer or publisher) public cryptographic key, which could then be decrypted using the entity's private cryptographic key.

In some implementations, the encryption process also accommodates for key rotation. For example, there may be instances where the cryptographic key used to encrypt the data structure may no longer be used by an entity and instead, the entity may currently be using a different cryptographic key. To accommodate for such key rotation, a "keyid" or the key identifier, which identifies the key used to encrypt the data structure, may also be included along with the encrypted data structure. Thus, at the time of decryption, the keyid allows identifying the appropriate cryptographic key needed to decrypt the data structure.

At step 310, the publisher 108 includes the encrypted premium content with the media. The publisher 108 also removes the unencrypted premium content from the media. For example, in the case of a document written in a markup language such as HTML, the unencrypted premium content is replaced with the encrypted premium content, which is output inside a <script> tag. A <script> tag is conventionally used to define a client-side script for non-markup content.

At step 312, the publisher 108 includes the encrypted data structures in the media. For example, in the case of a document written in a markup language such as HTML, the encrypted data structures may be included inside a <script> tag in the document's header 201-1.

At step 314, the encrypted media, including the encrypted data structures, the encrypted premium content, and where applicable, the free content, is transmitted to a host server, such as a media server 104.

Figure 4:
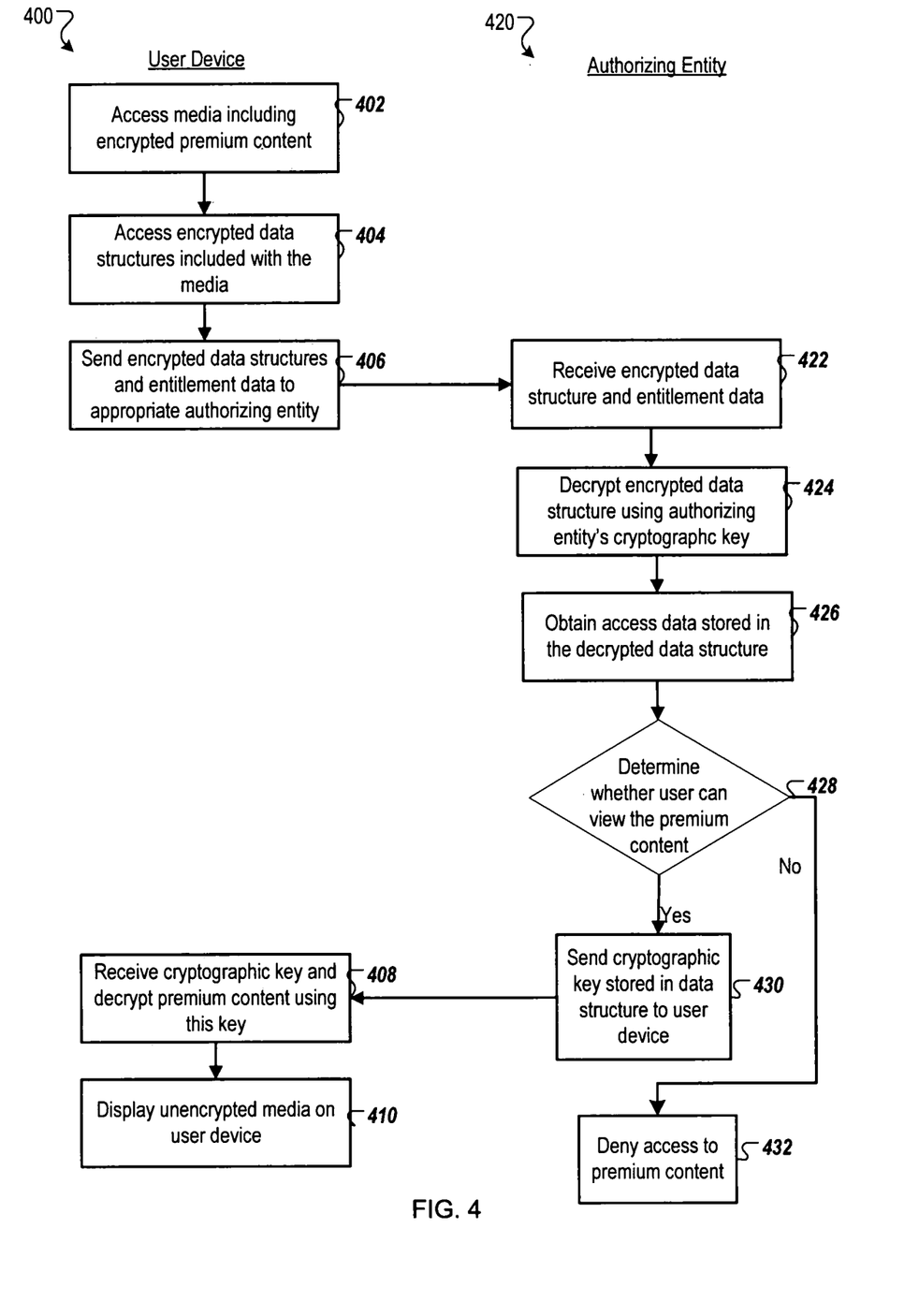
FIG. 4 is a flow diagram of example processes to decrypt the encrypted premium content in a user device and an authorizing entity.

FIG. 4 is a flow diagram of example processes to decrypt the encrypted premium content in a user device 400 and an authorizing entity 420. For purposes of FIG. 4, the user device 400 may include user device 106 and the authorizing entity 420 may include the publisher 108 or authorizers 204-1 to 204-*n*.

At step 402, the user device 400 accesses a media that includes encrypted premium content. For example, a user on its browser may select an article on a news website that includes premium content. This article may be a document written in a markup language, such as HTML. In this example, the browser presents the user with the article including a free portion and a premium portion, which is encrypted.

At step 404, the user device 400 accesses the encrypted data structures in the encrypted media. In the above example, the user device 400 access the encrypted data structures included in a <script> tag within the document's header.

At step 406, the user device 400 sends the encrypted data structures and entitlement data to the appropriate authorizing entities. For example, the user device 400 may use the entity identifier in each encrypted data structure to identify the encrypted data structure that is encrypted with the cryptographic key for the publisher 108. In addition, the user device may also use the entity identifier in the encrypted data structures to identify the respective authorizer specific encrypted data structures for authorizers 204-1 to 204-n. The user device may then send to the publisher 108, over the internet 102, the encrypted data structure (including the user's access entitlements) to the publisher 108. In parallel, the user device may also send to authorizers 204-1 to 204-n, over the internet 102, the authorizer specific encrypted data structures corresponding to each of these authorizers as well as the user's access entitlements.

For example, a user for an example website example.com, may be allowed to view all premium news on this website, if the user has either a monthly subscription, an annual subscription, or a trial membership. In this example, at step 406, the user device 400 sends to the publisher 108 and/or authorizers 204-1 to 204-n data, for example, in the form of a cookie or access tokens, the user's access entitlement.

At step 422, the authorizing entity 420 receives from the user device 400, information, which may include the encrypted data structure as well as the user's access entitlements.

At step 424, the authorizing entity 420 decrypts the encrypted data structure using its cryptographic key. If the authorizing entity 420 uses symmetric encryption, the authorizing entity 420 decrypts the encrypted data structure using the same cryptographic key used to encrypt this data structure. Alternatively, if the authorizing entity 420 uses asymmetric encryption, the authorizing entity 420 decrypts the data structure using its private cryptographic key, which corresponds to the public key used to encrypt the data structure.

As described with reference to FIG. 3, a key identifier, which identifies the key used to encrypt the data structure, may also be included along with the encrypted data structure. In such a scenario, the authorizing entity 420 locates the cryptographic key with the same key identifier to decrypt the data structure. For example, when preparing to decrypt the encrypted data structure, the authorizing entity 420 may access the keyid in the encrypted data structure and then use this keyid to find the corresponding cryptographic key. When an authorizing entity 420 uses asymmetric encryption, the keyid included with the encrypted data structure is the keyid for the authorizing entity's 420 public cryptographic key. The keyid for the public cryptographic key is the same as the keyid for the corresponding private cryptographic key. Accordingly, the authorizing entity 420 uses the public cryptographic key's keyid in the encrypted data structure to locate the corresponding private cryptographic key with the same keyid. Once the authorizing entity 420 determines the appropriate cryptographic key based on the keyid, it uses this cryptographic key to decrypt the data structure.

At step 426, the authorizing entity 420 obtains from the decrypted data structure, the access data specifying required access entitlements for the premium content. In the above example, premium content for the example website www.example.com may be viewed by a user who has either a monthly subscription, the annual subscription, or a trial membership. Accordingly, the data structure would include the following access entitlements for the premium content: "monthly subscription," "annual subscription," or "trial membership."

At step 428, the authorizing entity 420 determines whether the user can view the premium content 201-3. For example, the authorizing entity 420 determines whether the user is entitled to access the media's premium content 201-3 by comparing the user's access entitlements with the access data included in the decrypted data structure. In the above example, the user device sends the user's access entitlements in the form of a cookie or access tokens. The authorizing entity 420 has its own record of the user's entitlements that it can look up using the cookie or the access token. The looked up data may then specify that the user's access entitlement is "monthly subscription," which is then compared to the required access entitlements for the premium content, which includes "monthly subscription," "annual subscription," and "trial membership." If the user's access entitlement is among the required access entitlements for the premium content, the authorizing entity 420 determines that the user can access the premium content. On the other hand, if the user's access entitlement is not among the required access entitlements for the premium content, the authorizing entity 420 determines that the user cannot access the premium content. In the above example, the authorizing entity 420 determines that the user has access to the premium content because the user's "monthly subscription" entitlement is among the necessary access entitlements to view the premium content.

If the authorizing entity 420 determines that the user is not authorized to view the premium content at step 428, the authorizing entity 420 denies access to the premium content 201-3 at step 432, in which case the premium content is not displayed on the user device 400.

If the authorizing entity 420 determines that the user has the appropriate entitlement to view the premium content at step 428, the authorizing entity 420 sends the cryptographic key stored in the decrypted data structure to the user device 400 at step 430.

At step 408, the user device 400 receives the cryptographic key from the authorizing entity 420 and uses this cryptographic key to the decrypt the encrypted premium content of the media.

At step 410, the client device 400 displays the unencrypted media. In the case where the media only included premium content, the client device 106 displays the entire decrypted premium content. When the media includes both free and premium content, the client device merges the decrypted premium content with the unencrypted free content and then displays the entire unencrypted media.

Figure 5:
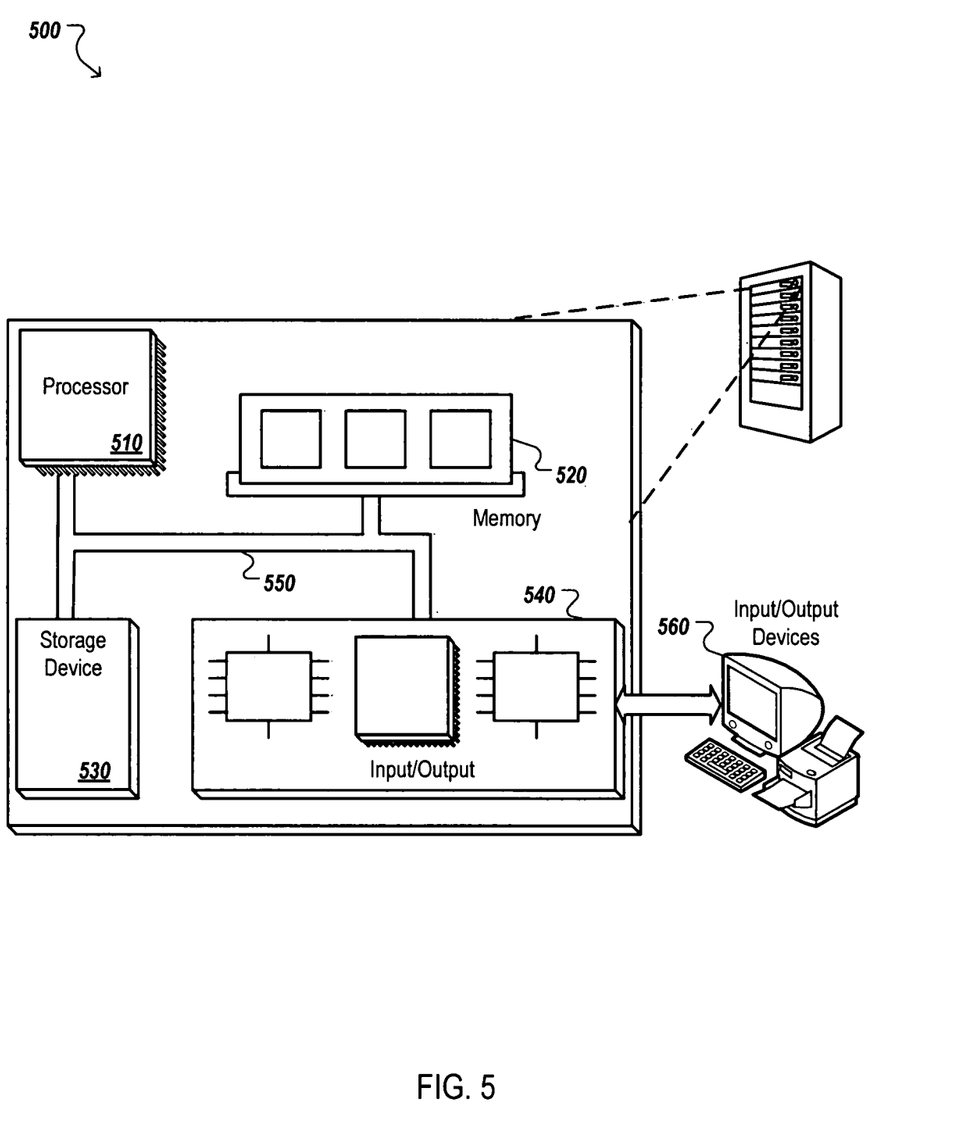
FIG. 5 is block diagram of an example computer system.

FIG. 5 is block diagram of an example computer system 500 that can be used to perform operations described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, a storage device that is shared over a network by multiple computing devices (e.g., a cloud storage device), or some other large capacity storage device.

The input/output device 540 provides input/output operations for the system 500. In one implementation, the input/output device 540 can include one or more of a network interface devices, e.g., an Ethernet card, a serial communication device, e.g., and recommended standard 232 (RS-232) port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Media does not necessarily correspond to a file. Media may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and compact disc read-only memory (CD-ROM) and digital versatile disc-read only memory (DVD-ROM) disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and yen initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method, comprising:
    generating a first cryptographic key for a source media having a first content portion and a second content portion that follows the first content portion in the source media;
    generating a partially encrypted media that includes the second content portion encrypted with the first cryptographic key and the first content portion presentable independently of and without access to the second content portion;
    generating a data structure comprising the first cryptographic key and an access data specifying access entitlements for the second content portion;
    encrypting, by a second cryptographic key, the data structure to generate an encrypted data structure; and
    including, with the partially encrypted media, the encrypted data structure.

2. The computer-implemented method of claim 1, further comprising:
    one or more authorizers different from a first entity that publishes the source media;
    for each authorizer of the one or more authorizers, encrypting, by a respective cryptographic key for the authorizer, the data structure to generate a respective authorizer specific encrypted data structure; and
    including, with the partially encrypted media, each authorizer specific encrypted data structure.

3. The computer-implemented method of claim 2, wherein the second cryptographic key and the respective cryptographic key for each authorizer are public keys.

4. The computer-implemented method of claim 3, wherein:
    the encrypted data structure includes a key identifier for the second cryptographic key; and
    each authorizer specific encrypted data structure includes a key identifier corresponding to the respective cryptographic key for the authorizer.

5. The computer-implemented method of claim 3, wherein:
    the source media comprises a document written in a markup language; and including the encrypted data structure and each authorizer specific encrypted data structure in a header of the document.

6. The computer-implemented method of claim 2, wherein each authorizer of the one or more authorizers comprises a search indexer, a cache service, a content delivery network, or a paywall service.

7. The computer-implemented method of claim 2, further comprising transmitting the partially encrypted media to a host server.

8. The computer-implemented method of claim 1, wherein the access data specifying access entitlements for the second content portion does not comprise any user identifying data.

9. The computer-implemented method of claim 1, wherein the first cryptographic key is a randomly generated key that is unique to the source media.

10. The computer-implemented method of claim 1, further comprising:
generating executable code configured to generate and send a request to authorize access to the second content portion comprising the encrypted data structure; and
including, with the partially encrypted media and the encrypted data structure, the executable code.

11. A system, comprising:
one or more memory devices storing instructions; and
one or more data processing apparatus that are configured to interact with the one or more memory devices, and upon execution of the instructions, perform operations including:
generating a first cryptographic key for a source media having a first content portion and a second content portion that follows the first content portion in the source media;
generating a partially encrypted media that includes the second content portion encrypted with the first cryptographic key and the first content portion presentable independently of and without access to the second content portion generating a data structure comprising the first cryptographic key and an access data specifying access entitlements for the second content portion;
encrypting, by a second cryptographic key, the data structure to generate an encrypted data structure; and
including, with the partially encrypted media, the first encrypted data structure.

12. The system of claim 11, further comprising:
one or more authorizers different from a first entity that publishes the source media;
for each authorizer of the one or more authorizers, encrypting, by a cryptographic key for the authorizer, the data structure to generate a respective authorizer specific encrypted data structure; and
including, with the partially encrypted media, each authorizer specific encrypted data structure.

13. The system of claim 12, wherein the second cryptographic key and the cryptographic key for each respective authorizer are public keys.

14. The system of claim 13, wherein:
the encrypted data structure includes a key identifier for the second cryptographic key; and
each authorizer encrypted data structure includes a key identifier corresponding to the respective cryptographic key for the authorizer.

15. The system of claim 13, wherein:
the source media comprises a document written in a markup language; and
including the encrypted data structure and each authorizer specific encrypted data structure in a header of the document.

16. The system of claim 12, wherein each authorizer of the one or more authorizers comprises a search indexer, a cache service, a content delivery network, or a paywall service.

17. The system of claim 12, further comprising transmitting the partially encrypted media to a host server.

18. The system of claim 11, wherein the access data specifying access entitlements for the second content portion does not comprise any user identifying data.

19. The system of claim 11, wherein the first cryptographic key is a randomly generated key that is unique to the source media.

20. A non-transitory computer readable medium storing instructions executable by a data processing apparatus and that upon such execution cause the data processing apparatus to perform operations comprising:
generating a first cryptographic key for a source media having a first content portion and a second content portion that follows the first content portion in the source media;
generating a partially encrypted media that includes the second content portion encrypted with the first cryptographic key and the first content portion presentable independently of and without access to the second content portion;
generating a data structure comprising the first cryptographic key and an access data specifying access entitlements for the second content portion;
encrypting, by a second cryptographic key, the data structure to generate an encrypted data structure; and
including, with the partially encrypted media, the encrypted data structure.

* * * * *